(12) United States Patent
Lee

(10) Patent No.: US 6,178,216 B1
(45) Date of Patent: Jan. 23, 2001

(54) DIGITAL PHASE LOCKED LOOP CIRCUIT AND METHOD THEREFOR

(75) Inventor: Ig-yong Lee, Gunpo (KR)

(73) Assignee: Samsung Electronics Co., Ltd., Kyungki-Do (JP)

( * ) Notice: Under 35 U.S.C. 154(b), the term of this patent shall be extended for 0 days.

(21) Appl. No.: 09/082,149

(22) Filed: May 21, 1998

(30) Foreign Application Priority Data

May 21, 1997 (KR) .................................. 97-19863
Apr. 30, 1998 (KR) .................................. 98-15528

(51) Int. Cl.[7] .................................. H03D 3/24
(52) U.S. Cl. .................................. 375/376; 327/147
(58) Field of Search .................................. 375/376, 375; 327/142, 147; 331/1 A

(56) References Cited

U.S. PATENT DOCUMENTS 3,921,095 * 11/1975 Chu ........................................ 331/1 A
5,103,192 *  4/1992 Sekine et al. ........................ 331/1 A
5,128,632 *  7/1992 Erhart et al. ......................... 331/1 A
5,847,614 * 12/1998 Gikbert et al. ........................ 331/14
5,896,066 *  4/1999 Katayama et al. ................... 331/1 A

* cited by examiner

Primary Examiner—Temesghen Ghebretinsae
(74) Attorney, Agent, or Firm—Sughrue, Mion, Zinn, Macpeak & Seas, PLLC

(57) ABSTRACT

A digital PLL circuit having an impulse noise remover for removing an impulse noise component from an external reference clock signal and for outputting an internal reference clock signal having had noise removed therefrom. The acquisitor and the phase detector receive the internal reference signal. The acquisitor generates a reset signal according to the external reference clock signal and according to an act mode signal for synchronizing with an external system. A phase detector, which is reset by the reset signal, is operative for comparing the phase of the external reference clock signal with that of a clock signal self-divided at the same frequency as the external reference clock signal. The phase detector generates a phase detection signal. A frequency synthesizer generates a corrected clock signal, by changing the division ratio of a system clock signal according to the phase detection signal and an act clock signal, to generate a locked final output.

11 Claims, 14 Drawing Sheets

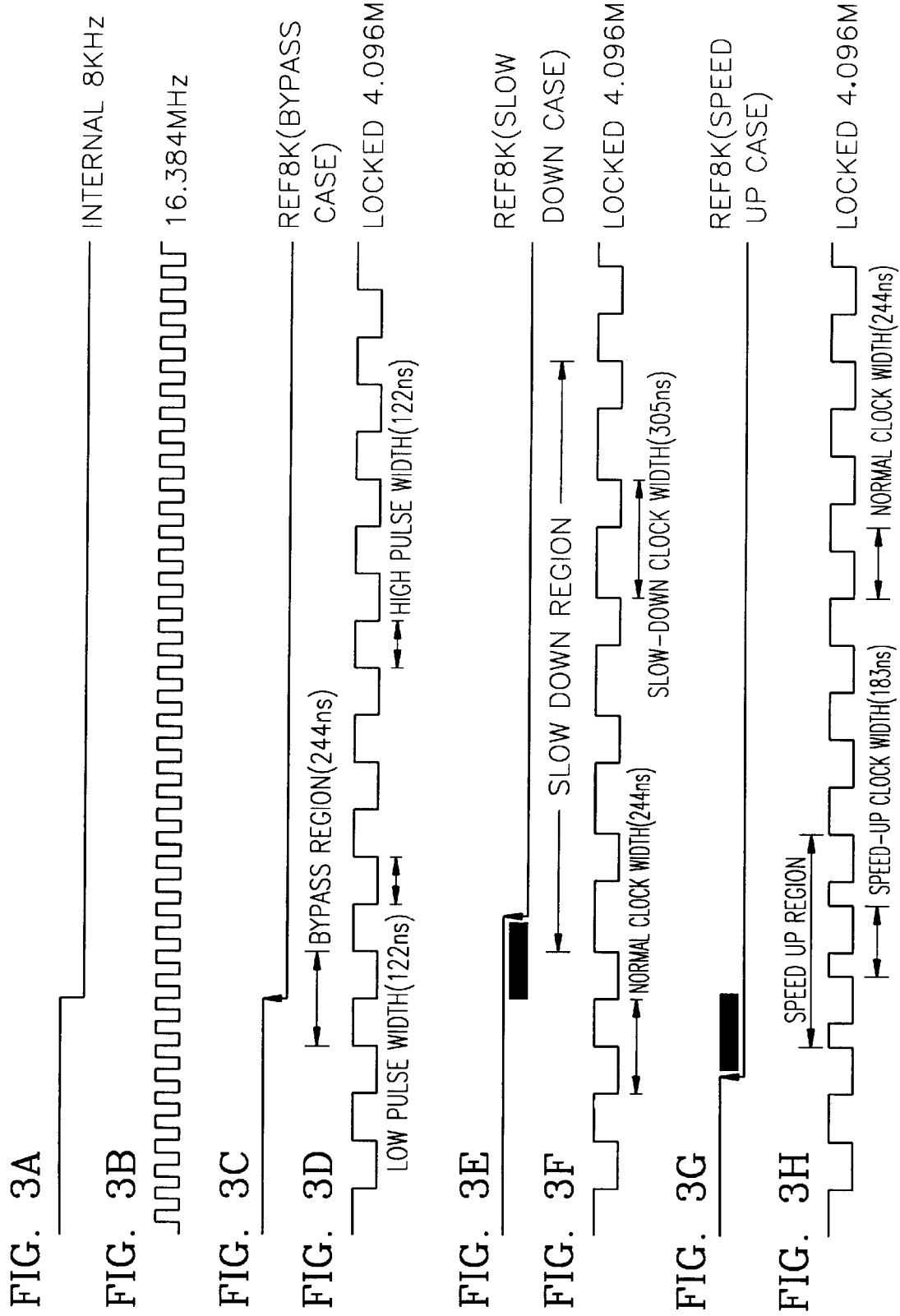

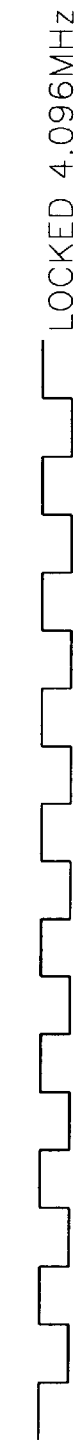
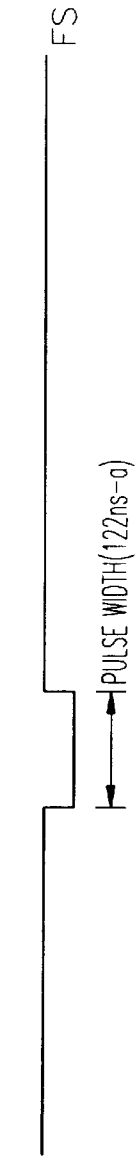
FIG. 4A 16.384MHz
FIG. 4B LOCKED 4.096MHz
FIG. 4C FS
PULSE WIDTH(122ns−a)
IF CLOCK SLOW DOWN MODE, THEN a=61ns,
OTHERWISE=0ns,

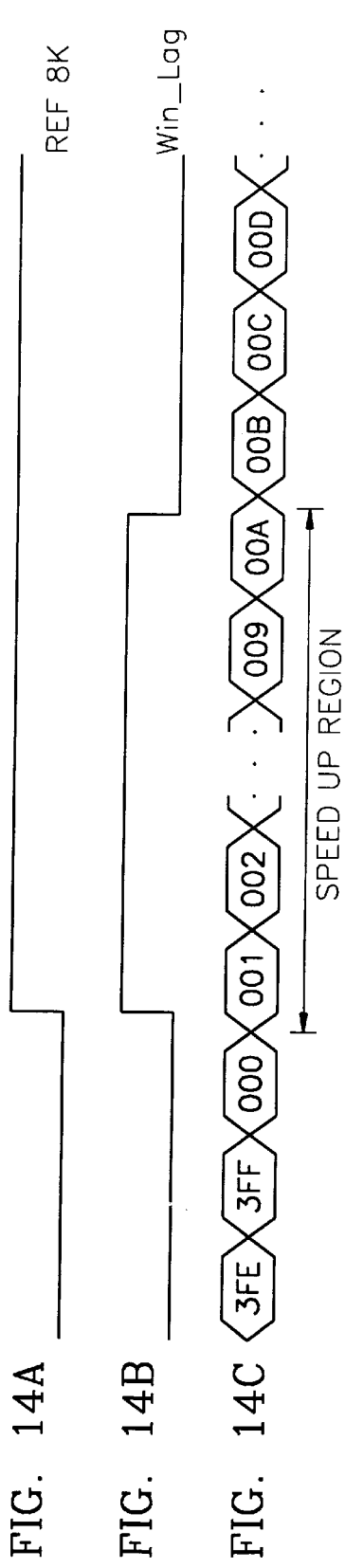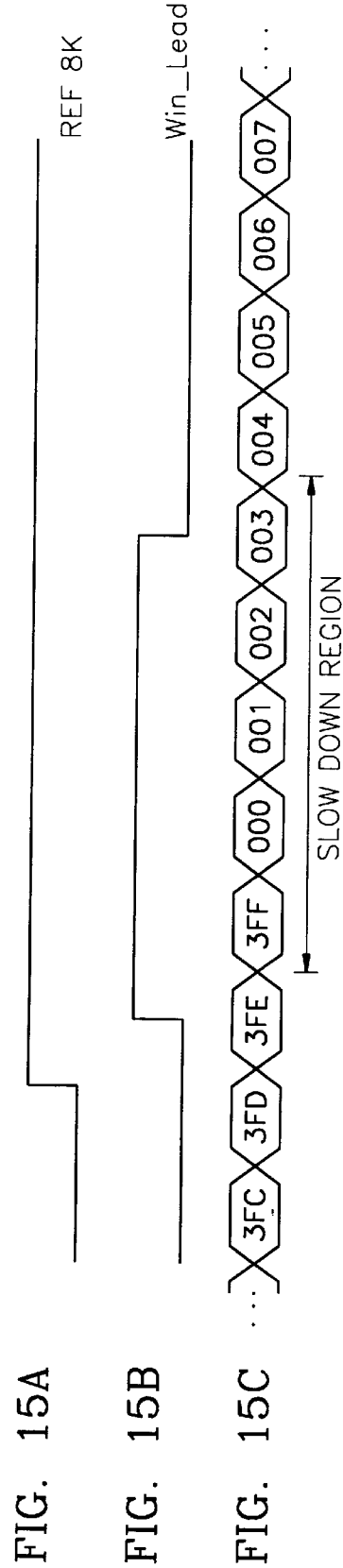
FIG. 14A
FIG. 14B
FIG. 14C
FIG. 15A
FIG. 15B
FIG. 15C

DIGITAL PHASE LOCKED LOOP CIRCUIT AND METHOD THEREFOR

BACKGROUND OF THE INVENTION

1. Field of the Invention

The present invention relates to a digital communication field, and more particularly, to a digital phase locked loop (PLL) circuit having a short initial synchronizing time and a digital PLL method.

2. Description of the Related Art

To connect two different networks, one network must be synchronized with the other. For example, when two different channels, such as a basic channel generally used in a private switching system, and an integrated services digital network (ISDN) which is another network, are connected to each other, data is lost during communication since the channels are not synchronized with each other due to a difference between system clock signals used in each channel.

SUMMARY OF THE INVENTION

To solve the above problem, it is a first objective of the present invention to provide a digital PLL circuit for maintaining two stable systems by correcting a clock signal of one system to synchronize it with a reference clock signal of the other system.

It is a second objective of the present invention to provide a digital PLL circuit which is simple and has a short synchronizing time by synchronizing a clock signal used in a switching system with a reference clock signal of an external network when the service of the external network is received by a private switching system and a keyphone switching system.

It is a third objective of the present invention to provide a digital PLL method for maintaining two stable systems by correcting a clock signal used in one system to synchronize it with a reference clock signal of the other system.

To achieve the first and second objectives, there is provided a digital PLL circuit, comprising an acquisitor for generating a reset signal according to a reference clock signal input from an outside source according to an act mode signal for synchronizing with an external system, a phase detector, reset by the reset signal, for comparing the phase of the reference clock signal with that of a first clock signal self-divided by the same frequency as the reference clock signal, and for generating a phase detection signal, and a frequency synthesizer for generating a corrected clock signal by changing the division ratio of a system clock signal according to the phase detection signal and an act clock signal locked as a final output.

To achieve the third objective, there is provided a digital PLL method, comprising the steps of (a) generating a reset signal according to a reference clock signal input from an outside source according to an act mode signal for synchronizing with an external system, (b) generating a phase detection signal by comparing the phase of the reference clock signal with that of a first clock signal self-divided by the same frequency as that of the reference clock signal, after being reset by the reset signal, and (c) generating a corrected clock signal by changing the division ratio of the system clock signal according to the phase detection signal and generating a locked act clock signal as a final result.

BRIEF DESCRIPTION OF THE DRAWINGS

The above objectives and advantages of the present invention will become more apparent by describing in detail a preferred embodiment thereof with reference to the attached drawings in which:

FIGS. 3A through 3H are timing diagrams of input and output signals of a frequency synthesizer shown in FIG. 1;

FIGS. 4A through 4C are timing diagrams related to a frame synchronizing signal generated in a phase detector shown in FIG. 1;

FIGS. 14A through 14C show waveforms of input and output signals of a first window signal generator shown in FIG. 13; and FIGS. 15A through 15C show waveforms of input and output signals of a second window signal generator shown in FIG. 13.

DESCRIPTION OF THE PREFERRED EMBODIMENTS

Figure 1:
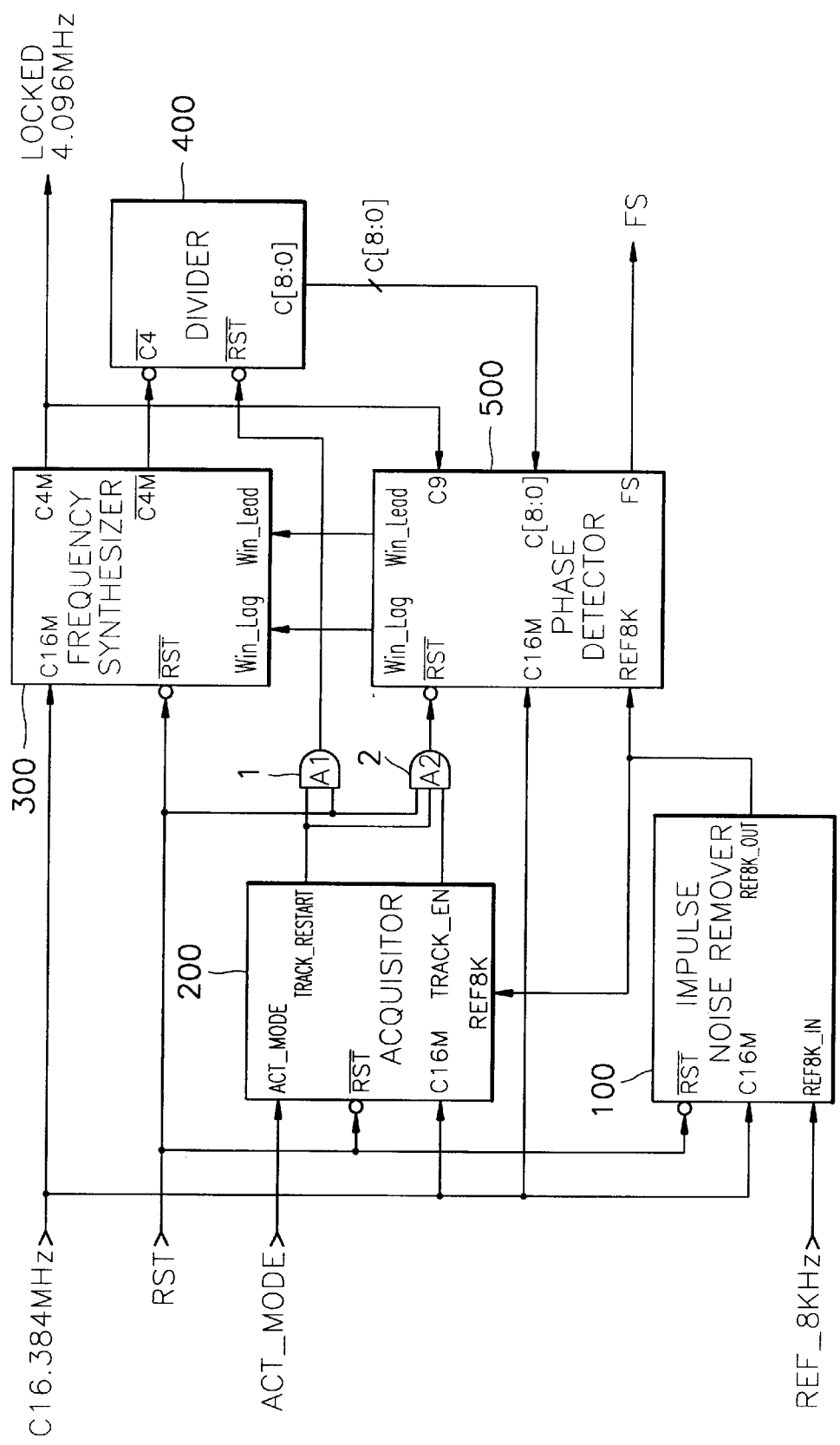
FIG. 1 is a block diagram showing an embodiment of a digital PLL circuit according to the present invention.

FIG. 1 is a block diagram showing an embodiment of a digital PLL circuit according to the present invention. In FIG. 1, a reference clock signal (RE_8KHz) of 8 KHz, supplied from an external network is input to a reference clock input port (REF8K_IN) of an impulse noise remover 100. A master clock signal (C16.384MHz) which is a system clock of 16.384 MHz is input to a clock input port (C16M). A system reset signal (RST) is input to an inverting reset port ($\overline{RST}$ 1). A reference clock output port (REF8K_OUT) is connected to a acquisitor 200 and a phase detector 500.

The acquisitor 200 receives an act mode signal (ACT_MODE), a system reset signal (RST), and a master clock signal (C16.384MHz) from the outside, outputs a track restart signal (TRACK_RESTART) to the inverting reset port ($\overline{RST}$ 2) of a divider 400 through a first AND gate 1, and outputs a track enable signal (TRACK_EN) to an inverting reset port ($\overline{RST}$ 3) of a phase detector 500 through a second AND gate 2. Here, the first AND gate 1 performs an AND operation on the track restart signal (TRACK_RESTART) and the system reset signal (RST). The second AND gate 2 performs an AND operation on the track restart signal (TRACK_RESTART), the track enable signal (TRACK_EN), and the system reset signal (RST).

A frequency synthesizer 300 receives the master clock signal (C16.384MHz), the system reset signal (RST), and first and second window signals (Win_Lag and Win_Lead) from the phase detector 500, and outputs a locked clock signal of 4.096 MHz. The divider 400 receives a corrected clock signal, output from an inverting output port ($\overline{C4M\ 4}$) of the frequency synthesizer 300, and the output signal of the first AND gate 1, and outputs a divided clock signal (C[8:0]) of 9 bits to the phase detector 500. The phase detector 500 receives the locked clock signal of 4.096 MHz output from the frequency synthesizer 300, the divided clock signals output from the divider 400, the output signal of the second AND gate 2, the master clock signal (C16.384MHz), and a reference clock signal having had impulse noise removed, output from the impulse noise remover 100, outputs the first and second window signals (Win_Lag and Win_Lead) to the frequency synthesizer 300, and generates a frame synchronizing signal (FS).

A switching system to which the digital PLL circuit shown in FIG. 1 is applied is for generating synchronized clock signals (for example, a clock signal of 8 KHz and a clock signal of 4.096 MHz) using the master clock signal of a system and the reference clock signal of 8 KHz from the other network, since a telephone call is performed using data obtained by pulse coded modulation (PCM) processing an aural signal of a 4 KHz band. Namely, the other system is synchronized to a reference system.

That is, when the ISDN is additionally employed in the private switching system and the keyphone switching system, a clock fail since the ISDN is not synchronized with a previously used network. Accordingly, data is lost or is not properly kept. In order to solve the problem, the clock signals of 4.096 MHz and 8 KHz locked to the reference clock signal required in the system are generated using the master clock signal of 16.384 MHz used in the switching system and using the clock signal of 8 KHz extracted from the data transferred to an ISDN serial line as the reference clock signal in the switching system. Accordingly, it is possible to provide a stable system in which the ISDN service is synchronized with the existing service.

The impulse noise remover 100 minimizes noise by removing the impulse component of noise included in the reference clock signal of 8 KHz, and provides a reliable reference clock signal to the acquisitor 200 and the phase detector 500. The acquisitor 200 solves the problem in that it takes a long time from an initial mode to perform locking, namely, to reach a tracking region. The acquisitor 200 forms inner synchronism with an act mode signal (ACT_MODE) and the reference clock signal having had the impulse noise removed, output from the impulse noise remover 100. Namely, when the act mode signal (ACT_MODE) is "low", the divider 400 is not reset by the track restart signal (TRACK_RESTART) output from the acquisitor 200 and free-run is performed in a free-run mode. When the act mode signal (ACT_MODE) changes to logic "high", in the case that synchronization is achieved with an external network, a reset pulse is generated, thus resetting the divider 400 through the first AND gate 1, and the track enable signal (TRACK_EN) is generated and applied to the phase detector 500 through the second AND gate 2, thus enabling the phase detector 500.

The frequency synthesizer 300 receives the master clock signal (C16.384MHz) and generates the clock signal of 4.096 MHz locked according to the window signals (Win_Lag and Win_Lead), supplied by the phase detector 500, or a corrected clock signal. The divider 400 divides the clock signal from 4.096 MHz to 8 KHz according to the system clock signal of the divider 400, outputs the divided clock signals to the phase detector 500, and divides the clock signal from 4.096 MHz to 8 MHz using the corrected clock signal.

Figure 2A:
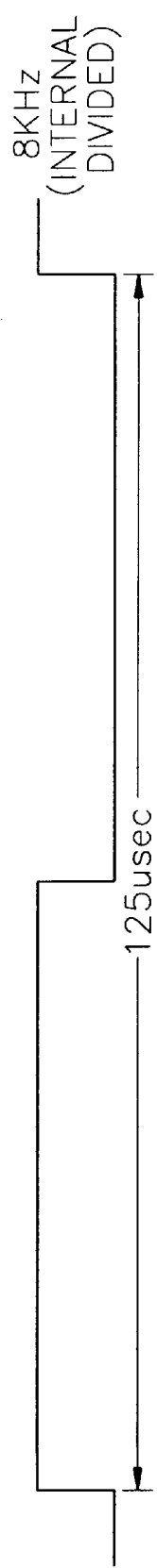
FIGS. 2A and 2B show waveforms of a clock signal divided in a divider shown in FIG. 1 and a reference clock signal input from an outside.
Figure 2B:
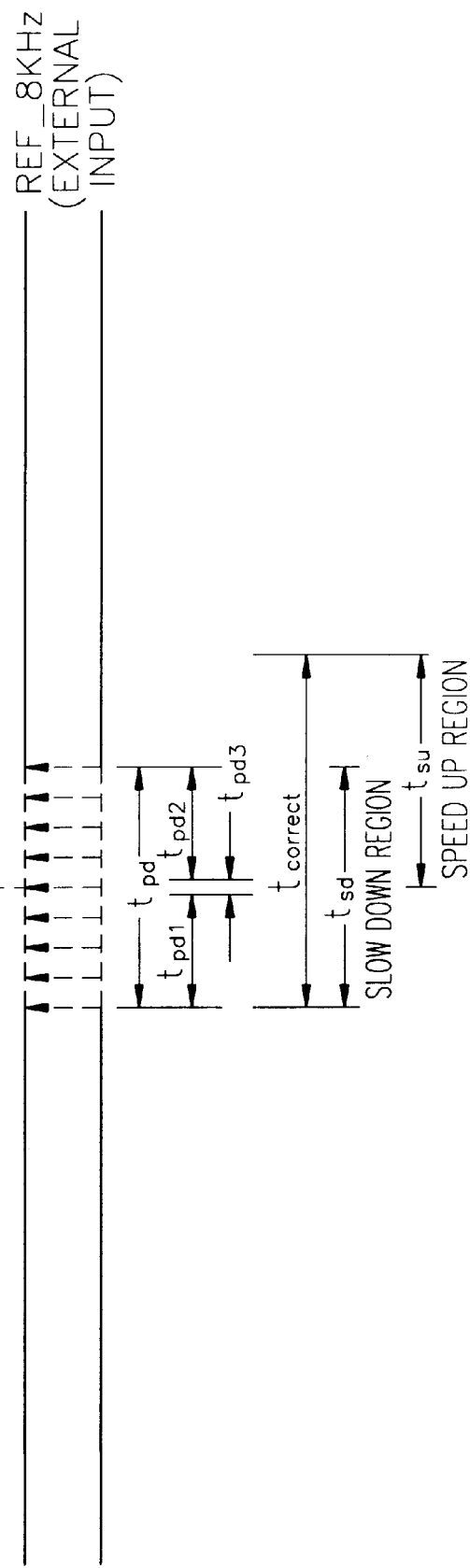

The phase detector 500 compares the phase of the clock signal of 8 KHz self-divided in the divider 400 and shown in FIG. 2A with the phase of the reference clock signal of 8 KHz used in the external network, output from the impulse noise remover 100 and shown in FIG. 2B, determines whether the selfdivided clock signal lags or leads the reference clock signal, and generates the first and second window signals (Win_Lag and Win_Lead). When the phase of the self-divided clock signal is compared with that of the reference clock signal, it is possible to determine whether the existing system is synchronized with the external network. $t_{pd}, t_{pd1}, t_{pd2}, t_{pd3}, t_{correct}, t_{sd}$, and $t_{su}$, shown in FIG. 2B, respectively denote an entire phase detection region, a slow down phase detection region, a speed up phase detection region, a bypass phase detection region, an entire frequency correction region, a slow down frequency correction region, and a speed up frequency correction region.

Therefore, when the phase detector 500 compares the reference clock signal with the clock signal of 8 KHz generated by the divider 400 and shown in FIG. 3A, there is always a physical difference. In order to prevent self-jitter, in which a corrected value is larger than a real phase difference when the clock signal output from the frequency synthesizer 300 is corrected, since the self-divided clock signal is determined to "lag" or "lead" the reference clock signal even when the difference between two clock signals is infinitesimal, when there is a phase difference in a window (a pass window) such as the bypass case shown in FIG. 3(C), the clock signal is passed without being corrected. At this time, the size of the pass window is determined according to the vibration degree of the network. Since the digital PLL according to the present invention is designed to match an ISDN S/T interface (here, a basic rate interface (BRI)), one period of the clock generated from the frequency synthesizer 300 has a size of 244 ns as shown in FIG. 3D. Additionally, there are the BRI and a primary rate interface (PRI) in the ISDN S/T interface existing between a user and a network, used in a narrow-band ISDN. It is preferable that the present invention matches the BRI.

Namely, this is to prevent self-jitter, caused since there is little probability that the divided clock signal of 8 KHz shown in FIG. 3A is synchronized with the reference clock signal shown in FIG. 3C in the case of the pass window. When the phase difference of the two clock signals is received in the pass window region, the clock signals are passed without being corrected. When a correction is generated in the correction region, the clock signals are corrected by half the period of the clock signal of 4.096 MHz. FIG. 3B shows the waveform of the master clock signal of 16.384 MHz.

When the slow down mode, for lowering the speed of the clock signal of 4.096 MHz, is entered, since the clock signal of 8 KHz divided in the divider 400 (FIG. 3A) leads the reference clock signal shown in FIG. 3E, the frequency synthesizer 300 changes the self-divided clock signal (4.096MHz) shown in FIG. 3F and generates a clock signal which operates slower than a normal clock signal of 4.096 MHz in the slow down region. The number of the corrected clock signal is changed, considering the slow down correction region. The clock signal of 4.096 MHz is divided to have a normal size, except for the correction region.

When the speed up mode, for raising the speed of the clock signal of 4.096 MHz, is entered, since the clock signal divided in the divider 400 (FIG. 3A) lags the reference clock signal shown in FIG. 3G, the frequency synthesizer 300 changes the clock signal of 4.096 MHz as shown in FIG. 3H and generates a clock signal which operates faster than the normal clock signal of 4.096 MHz, in the speed up region.

Therefore, the self-divided clock signal is synchronized with the reference clock signal of 8 KHz by generating the clock signal of 4.096 MHz, corrected so that the external reference clock signal is locked to the self-divided clock signal, and generating the clock signal of 8 KHz in the divider 400 using the corrected clock signal 4.096 MHz.

A frame synchronizing signal (FS), which is the network synchronizing signal shown in FIG. 4C, is output from the phase detector 500 which receives the master clock signal of 16.384 MHz shown in FIG. 4A and the clock signal of 4.096 MHz output from the frequency synthesizer 300 shown in FIG. 4B. As shown in FIG. 4C, a is 61 ns in the slow down mode and 0 ns in other modes.

Figure 5:
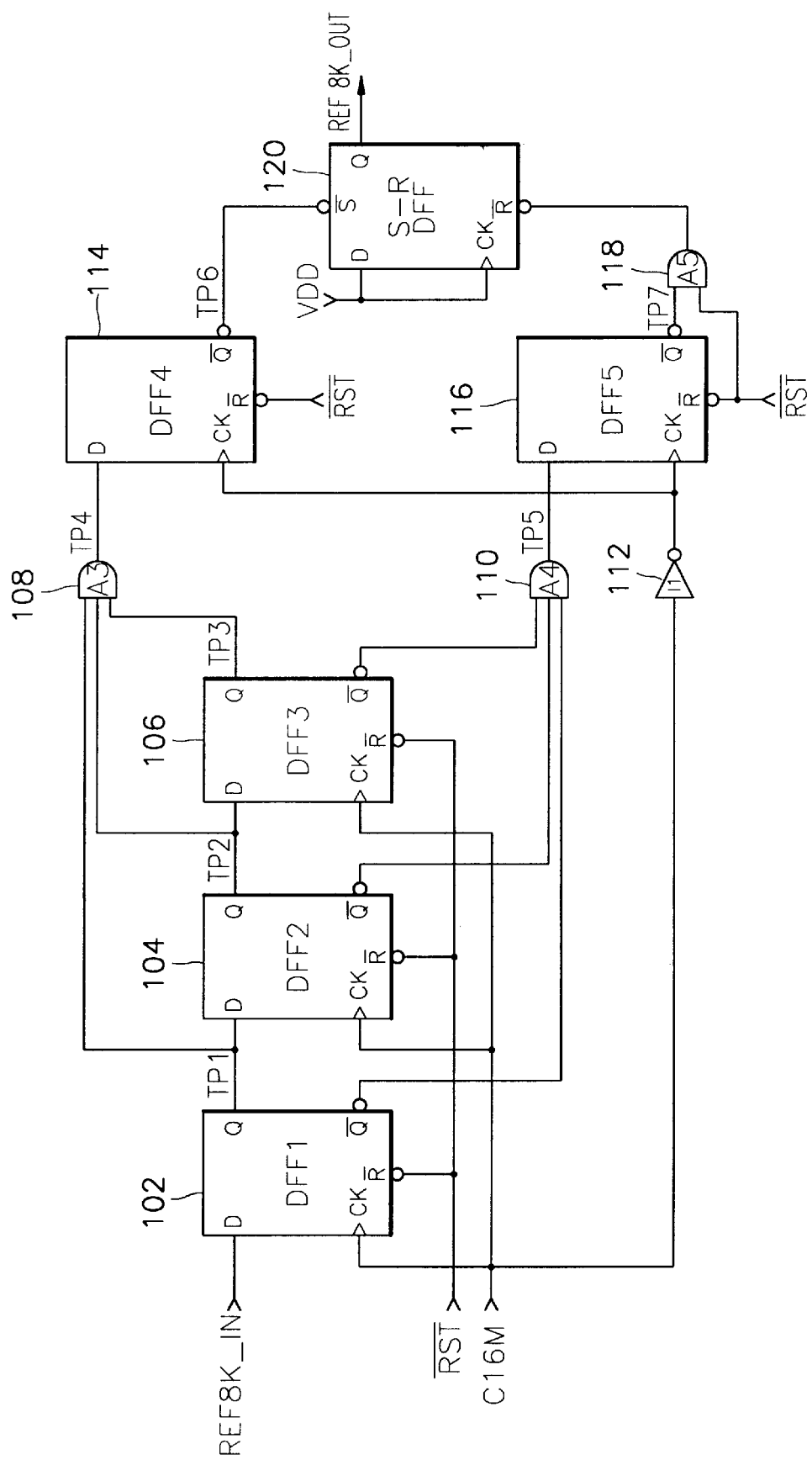
FIG. 5 is a circuit diagram of an impulse noise remover shown in FIG. 1.

FIG. 5 is a detailed circuit diagram showing the impulse noise remover 100 shown in FIG. 1 which samples the reference clock signal applied from the external network according to the master clock, shifts the sampled reference clock signal, adds the shifted reference clocks, and delays them for a predetermined time, thus removing a short impulse of not more than a predetermined number of bits.

Figure 6:
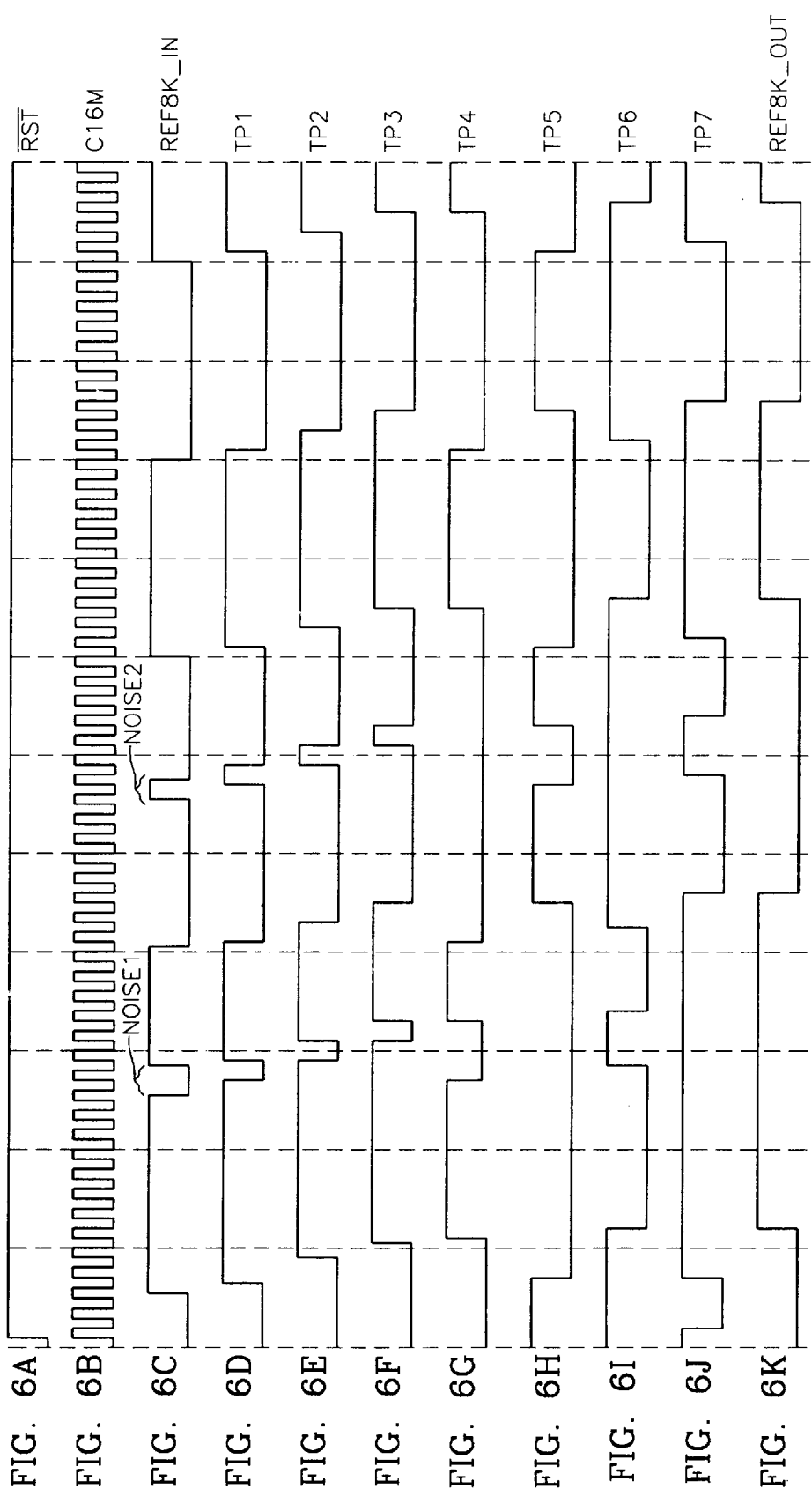
FIGS. 6A through 6K are timing diagrams showing the operation of an impulse noise remover shown in FIG. 5.

Namely, FIG. 6D shows the waveform of the output TP1 of a first D flip-flop 102, reset by the inverted reset signal ($\overline{RST}$ 5) shown in FIG. 6A, and receiving the reference clock signal (REF8K) including impulse noise (NOISE 1 and NOISE 2) shown in FIG. 6C according to the master clock signal (C16M) shown in FIG. 6B. FIG. 6E shows the waveform of the output TP2 of a second D flip-flop 104, reset by the inverted reset signal ($\overline{RST}$ 6), and receiving the output of the first D flip-flop 102 according to the master clock signal C16M. FIG. 6F shows the waveform of the output TP3 of a third D flip-flop 106, reset by the inverted reset signal ($\overline{RST}$ 7), and receiving the output of the second D flip-flop 104 according to the master clock signal C16M.

A third AND gate 108 performs an AND operation on the outputs of the first, second, and third D flip-flops 102, 104, and 106, and outputs a signal TP4 shown in FIG. 6G. A fourth AND gate 110 performs an AND operation on the inverted outputs of the first, second, and third D flip-flops 102, 104, and 106, and outputs a signal TP5 shown in FIG. 6H.

FIG. 6I shows the waveform of the output TP6 of a fourth D flip-flop 114, reset by the inverted reset signal ($\overline{RST}$ 8), and latching the output of the third AND gate 108 according to the master clock signal inverted by a first inverter 112. FIG. 6J shows the waveform of the output TP7 of a fifth D flip-flop 116, reset by the inverted reset signal ($\overline{RST}$ 9), and latching the output of a fourth AND gate 110 according to the master clock signal inverted by the first inverter 112. A fifth AND gate 118 performs an AND operation on the inverted output of the fifth D flip-flop 116 and the inverted reset signal ($\overline{RST}$ 10).

The input port (D) and the clock port (CK) of a set-reset flip-flop (S-R FF) 120 both receive a drive voltage VDD, an inverting set port ($\overline{S}$ 11) receives the inverted output of the fourth D flip-flop 114, and the inverting reset port ($\overline{R}$ 12) receives the output of the fifth AND gate 118. The reference clock signal (REF8K_OUT) having had the impulse noise removed and delayed for a predetermined time, shown in FIG. 6K, is output from the output port (Q) of the set-reset flip-flop 120.

The impulse noise remover 100 removes only pulses of not more than two bits from the master clock signal of 16.384 MHz, using D flip-flops 102, 104, and 106 as three bit shift registers. In order to remove bigger noise pulses, the number of bits of the shift register can be increased. In the first noise pulse (NOISE 1) of two bits shown in FIG. 6C, low noise is included in the reference clock signal. In the second noise pulse (NOISE 2) of one bit, high noise is included in the reference clock signal. The impulse noise remover 100 serves as a low pass filter for removing the high frequency component of the reference clock signal, which is the most important signal from the network.

Figure 7:
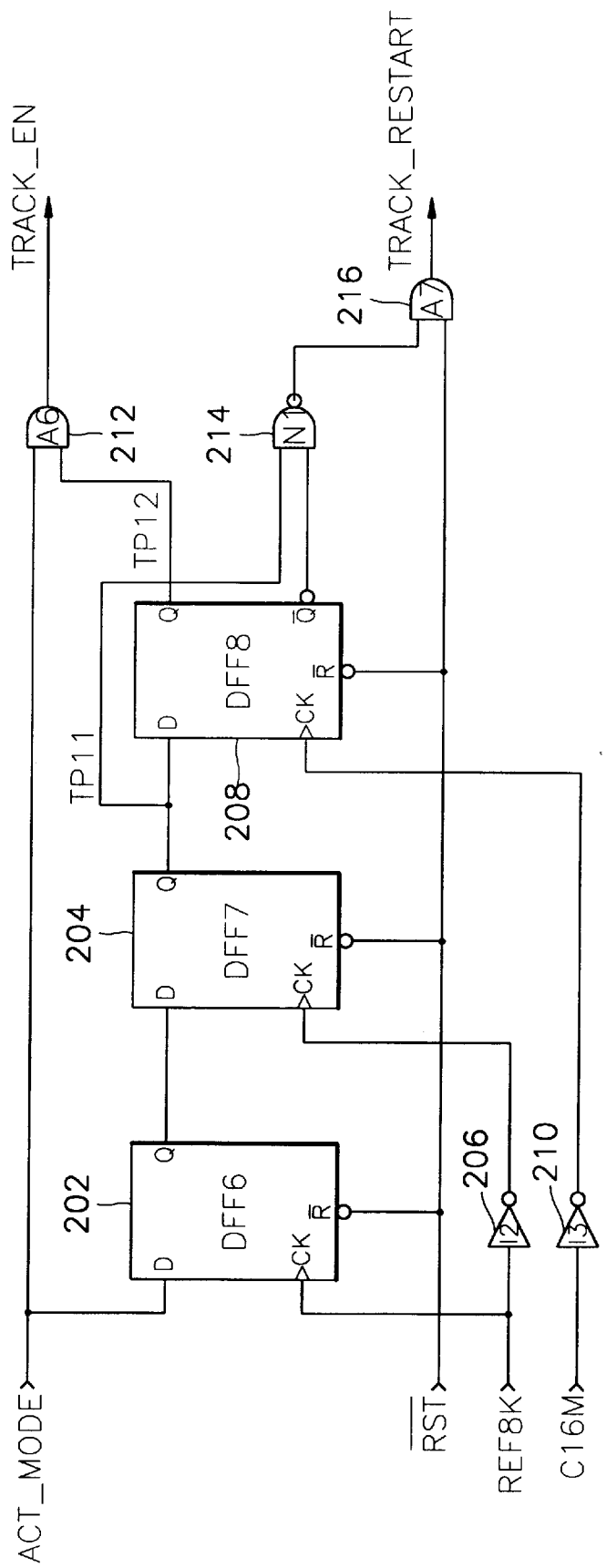
FIG. 7 is a circuit diagram of a acquisitor shown in FIG. 1.
Figure 8:
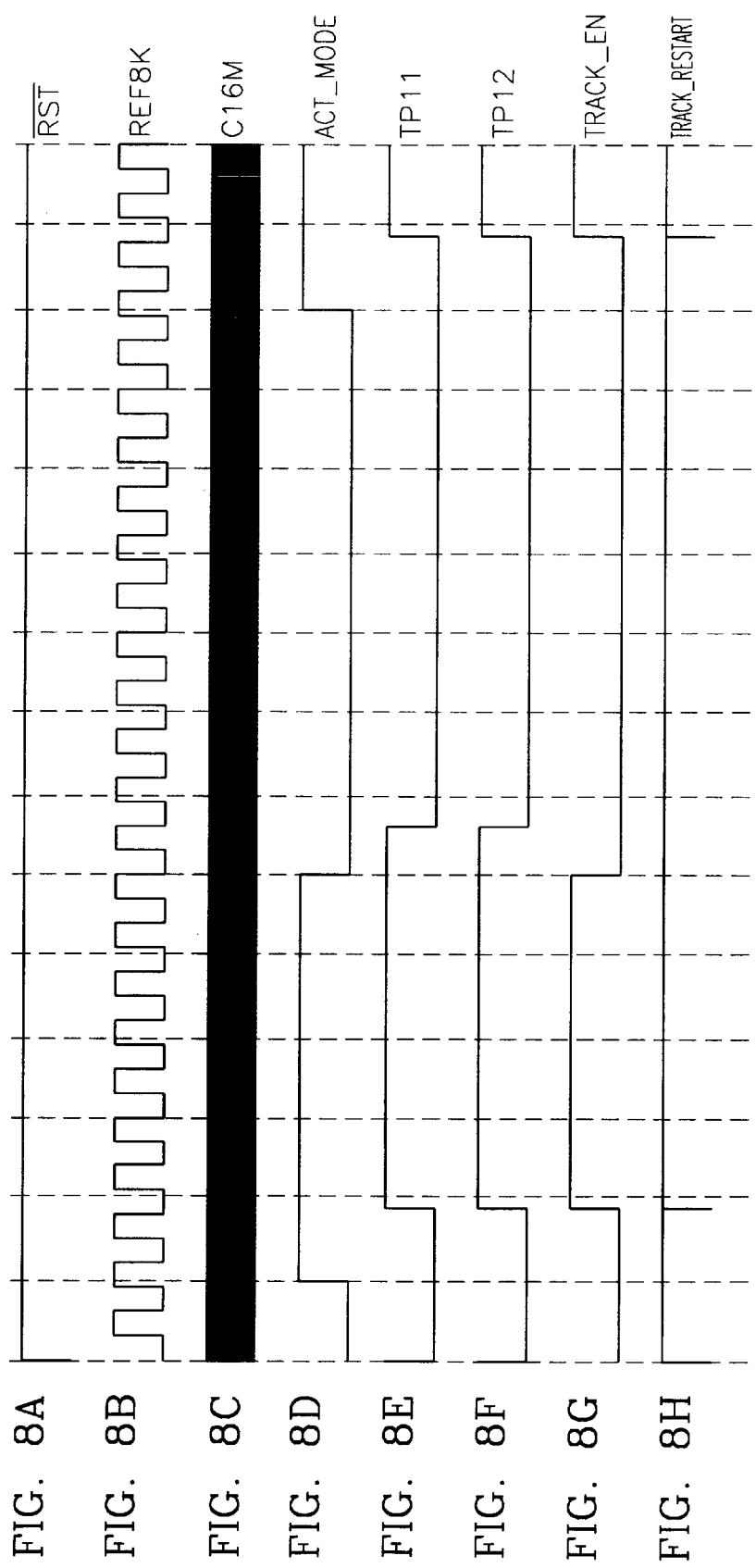
FIGS. 8A through 8H are timing diagrams showing the operation of the acquisitor shown in FIG. 7.
Figure 9:
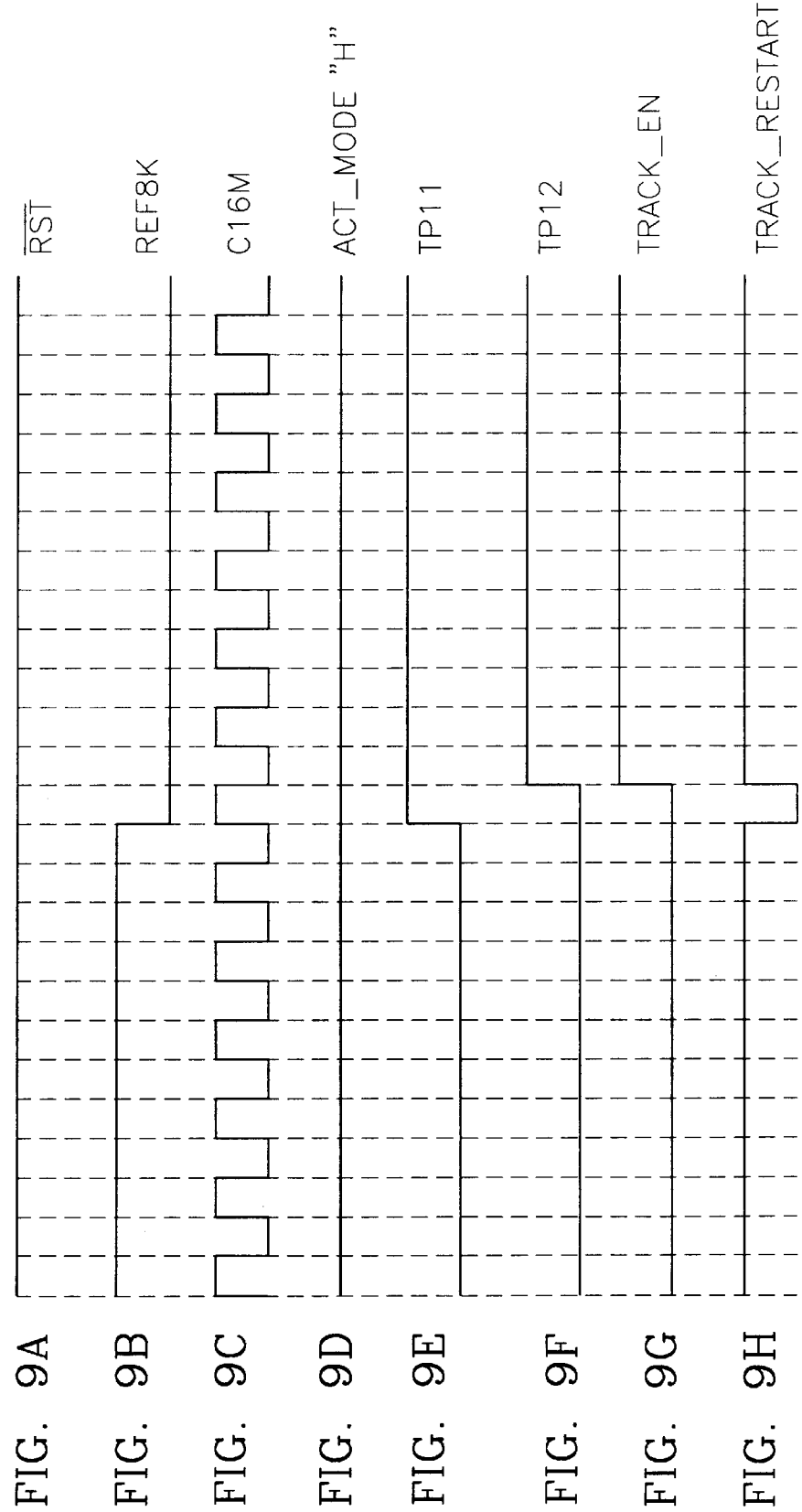
FIGS. 9A through 9H are enlargements of some of FIGS. 8A through 8H.

FIG. 7 is a circuit diagram of the acquisitor 200, shown in FIG. 1 for achieving rapid synchronism using the edges of the reference clock signal (REF8K) and the active section of the act mode signal (ACT_MODE) used as an enable signal of the PLL circuit In FIG. 7, the act mode signal (ACT_MODE) shown in FIG. 8D is input to the input port (D) of a sixth D flip-flop 202. The reference clock signal (REF8K) shown in FIG. 8B, output from the impulse noise remover 100 shown in FIG. 1, is input to the clock port (CK) of the sixth D flip-flop 202. The inverting reset signal ($\overline{RST}$ 13) shown in FIG. 8A is input to the inverting reset port ($\overline{R}$ 14) of the sixth D flip-flop 202. The output of the sixth D flip-flop 202 is input to the input port (D) of a seventh D flip-flop 204. The reference clock signal inverted by a second inverter 206 is input to the clock port (CK) of the seventh D flip-flop 204. The inverted reset signal ($\overline{RST}$ 15) is input to the inverting reset port ($\overline{R}$ 16) of the seventh D flip-flop 204. An output signal TP 11 shown in FIG. 8E is output to the output port (Q).

The output signal (FIG. 8E) of the seventh D flip-flop 204 is input to the input port (D) of an eighth D flip-flop 208, the master clock inverted by a third inverter 210 is input to the clock port (CK) thereof, the inverted reset signal ($\overline{RST}$ 17) is input to the inverting reset port ($\overline{R}$ 18) thereof The output signal TP12 shown in FIG. 8F of the seventh D flip-flop 204 is output from the output port (Q). The waveform of the master clock signal (C16M) input to the third inverter 210 is shown in FIG. 8C.

A sixth AND gate 212 performs an AND operation with respect to the act mode signal (ACT_MODE) and the output signal of the eighth D flip-flop 208, and outputs a track enable signal (TRACK_EN) shown in FIG. 8G. A first NAND gate 214 performs a NAND operation on the inverted output signal of the eighth D flip-flop 208 and the output signal of the seventh D flip-flop 204. A seventh AND gate 216 performs an AND operation on the output of the first NAND gate 214 and the inverted reset signal ($\overline{RST}$ 19) and outputs the track restart signal (TRACK_RESTART) shown in FIG. 8H.

In FIGS. 9A through 9H, some sections of the signals shown in FIGS. 8A through 8H are enlarged right after the act mode signal (ACT_MODE) becomes "high", in order to aid understanding of the operation of the acquisitor 200 shown in FIG. 7.

The acquisitor 200 is for minimizing the time from a free-run state in which the digital PLL does not operate, namely, the act mode (ACT_MODE) is not activated (logic "low"), thus it is not necessary to synchronize with the external network, the reference clock is not input, and synchronism is to be achieved only in the switching system, to synchronizing state with the external network when the act mode signal (ACT_MODE) changes to logic "high".

Figure 10:
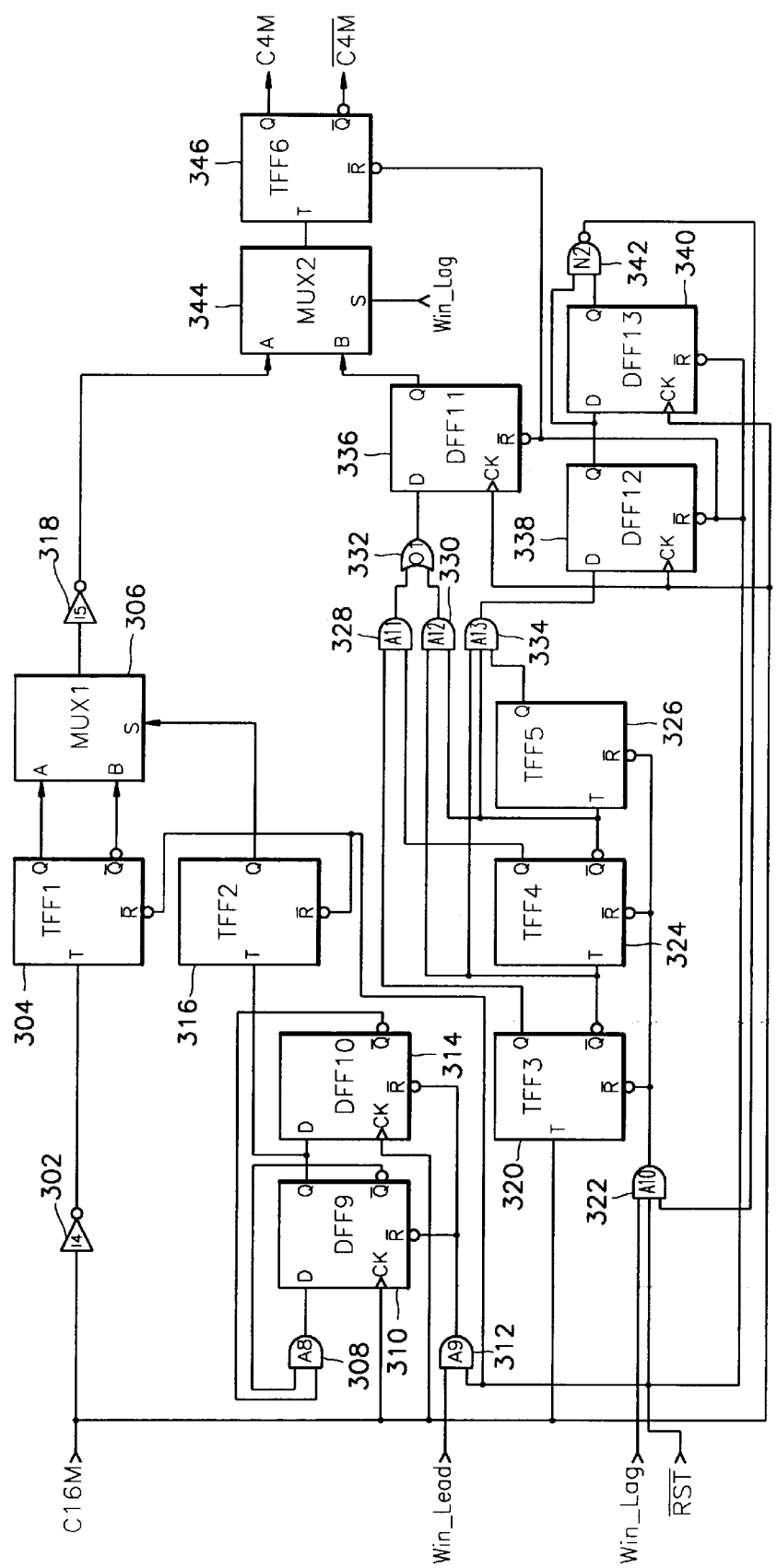
FIG. 10 is a circuit diagram of the frequency synthesizer shown in FIG. 1.

FIG. 10 is a circuit diagram of the frequency synthesizer 300. In FIG. 10, the output port of the fourth inverter 302, for inverting the master clock signal (C16M), is connected to the input port (T) of a first T flip-flop (TFF) 304, the inverting reset port ($\overline{R}$ 20) receives the inverted reset signal ($\overline{RST}$ 21) thereof. The output and inverted output of the first T flip-flop 304 are input to first and second input ports (A and B) of a multiplexer 306 and one of them is selected according to the output of a second T flip-flop 316 input to a selection port (S) thereof. The selected signal is output to a fifth inverter 318.

An eighth AND gate 308 performs an AND operation on the inverted output of a ninth D flip-flop 310 and the inverted output of a tenth D flip-flop 314. The ninth D flip-flop 310 latches the output of the eighth AND gate 308 20 according to the master clock signal (C16M) and is reset by the output of a ninth AND gate 312. The ninth AND gate 312 performs an AND operation on the second window signal (Win_Lead) output from the phase detector 500 shown in FIG. 1 and the inverted reset signal ($\overline{RST}$ 22), and outputs the AND operation result to the inverting reset ports ($\overline{R}$23) of the ninth and tenth D flip-flops 310 and 314.

The tenth D flip-flop 314 latches the output of the ninth D flip-flop 310 according to the master clock signal (C16M). The second T flip-flop 316 receives the output of the ninth D flip-flop 310 and is reset by the inverted reset signal ($\overline{RST}$ 24). The output of the ninth D flip-flop 310 is output as a selection signal of the multiplexer 306.

A third T flip-flop 320 operates according to the master clock signal (C16M) and is reset according to the output of a tenth AND gate 322. The tenth AND gate 322 performs an AND operation on the first window signal (Win_Lag) output from the phase detector 500, the inverted reset signal ($\overline{RST}$ 25), and the output of a second NAND gate 342, and applies the AND operation result to the reset ports ($\overline{R}$ 26) of third, fourth and fifth T flip-flops 322, 324 and 326.

The fourth T flip-flop 324 receives the inverted output of the third T flip-flop 322. The fifth T flip-flop 326 receives the inverted output of the fourth T flip-flop 324. An eleventh AND gate 328 performs an AND operation on the output of the third T flip-flop 322 and the output of the fourth T flip-flop 324, and outputs the AND operation result to one input port of a first OR gate 332. A twelfth AND gate 330 performs an AND operation on the inverted output of the third T flip-flop 322 and the inverted out put of the fourth T flip-flop 324, and outputs the AND operation result to the other input port of the first OR gate 332. A thirteenth AND gate 334 performs an AND operation on the inverted outputs of the third and fourth T flip-flops 322 and 324 and the output of the fifth T flip-flop 326.

An eleventh D flip-flop 336 receives the output of the first OR gate 332 according to the master clock signal (C16M), and is reset by the inverted reset signal ($\overline{RST}$ 27). A twelfth D flip-flop 338 receives the output of the thirteenth AND gate 334 according to the master clock signal (C16M), and is reset by the inverted reset signal ($\overline{RST}$ 28). A thirteenth D flip-flop 340 receives the output of the twelfth D flip-flop 338 according to the master clock signal (C16M), and is reset by the inverted reset signal ($\overline{RST}$ 29). A second NAND gate 342 performs a NAND operation on the output of the twelfth D flip-flop 338 and the output of the thirteenth D flip-flop 340, and feeds back the NAND operation result to the tenth AND gate 322.

A second multiplexer 344 selects the output of a fifth inverter 318 or the output of the eleventh D flip-flop 336 according to the first window signal (Win_Lag), and applies the selected output to a sixth T flip-flop 346. The locked clock signal (C4M) of 4.096 MHz is output from the output port (Q) of the sixth T flip-flop 346, the output ($\overline{C4M}$ 30) of the inverting output port ($\overline{Q}$31) thereof is applied to the divider 400. The locked output (C4M) of 4.096 MHz output from the sixth T flip-flop 346 becomes the output of the digital PLL circuit.

Namely, when the first and second window signals (Win_Lag and Win_Lead) are logic "low", namely, when the difference between the reference clock signal of 8 KHz and the clock signal of 8 KHz divided in the divider 400 is within the bypass window, the clock signal of 4.096 MHz, divided into four, of the master clock signal (C16M) is output through the output ports (Q) of the first T flip-flop 304, the first multiplexer 306, the second multiplexer 344, and the sixth T flip-flop 346. The first and sixth T flip-flops 304 and 346 divide the clock signal into two respectively. The first multiplexer 304 maintains a previous state. The second multiplexer 344 always selects a first input port (A).

In the case of the slow down mode of lowering the speed of the clock signal of 4.096 MHz divided in the divider 400, since the clock signal of 8 KHz divided in the divider 400 leads the reference clock signal of 8 KHz, the ninth and tenth D flip-flops 310 and 314 for dividing the clock signal into three operate when the second window signal (Win_Lead) of logic "high" is generated by the phase detector 500. The second T flip-flop 316 generates a selection signal so as to select the second input port (B) of the first multiplexer 306. The clock signal corrected through the first input port (A) of the second multiplexer 344 and the inverting output port ($\overline{Q}$ 32) of the sixth T flip-flop 346, i.e., the corrected clock signal of the master clock signal, divided into three is output in the second window region.

In the case of the speed up mode of raising the speed of the clock signal of 4.096 MHz divided in the divider 400, since the clock signal of 8 KHz divided in the divider 400 lags the reference clock signal of 8 KHz, the third, fourth, and fifth T flip-flops 320, 324, and 326 and the eleventh, twelfth, and thirteenth D flip-flops 336, 338, and 340 operate when the first window signal (Win_Lag) of logic "high" is generated by the phase detector 500. The second multiplexer 344 selects the output of the eleventh D flip-flop 336 input from the second input port (B). The clock signal corrected through the inverting output port ($\overline{Q}$ 33) of the sixth T flip-flop 346, i.e., the corrected clock signal of the master clock signal, divided into five, is applied to the divider 400.

Namely, when the master clock signal (C16M) generates the clock signal of 4.096 MHz locked through the sixth T flip-flop 346, the corrected clock signal is generated having four clock signals during a period in a normal mode, three clock signals during a period in the slow down mode, and five clock signals during a period in the speed up mode.

Figure 11:
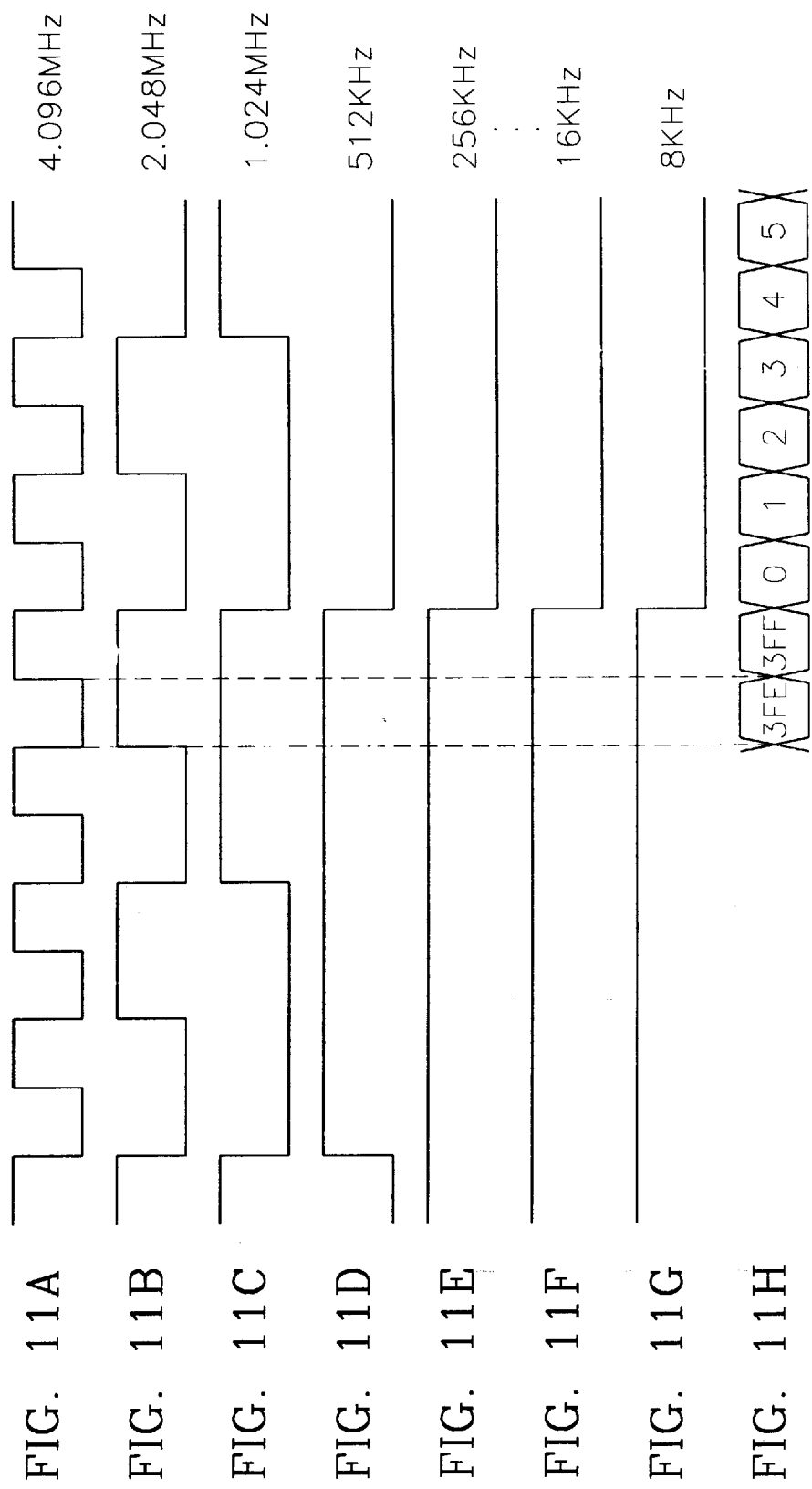
FIGS. 11A through 11G are timing diagrams showing an output signal of the divider shown in FIG. 1.
FIG. 11H is a timing diagram of an output signal of a phase detector shown in FIG. 1.

FIGS. 11A through 11G show waveforms output from the divider 400 shown in FIG. 1. A clock signal of 4.096 MHz shown in FIG. 11 A, is output to the least significant bit of the divider 400. A clock signal of 2.048 MHz shown in FIG. 11B, a clock signal of 1.024 MHz shown in FIG. 11C, a clock signal of 512 KHz shown in FIG. 11D, a clock signal of 256 KHz shown in FIG. 11E, a clock signal (not shown) of 128 KHz, a clock signal (not shown) of 64 KHz, and a clock signal (not shown) of 32 KHz and a clock signal of 16 KHz shown in FIG. 11F are output from the divider 400. A clock signal of 8 KHz shown in FIG. 11G is output to the most significant bit of the divider 400.

FIG. 11H shows hexadecimal numbers 0 through 3FF which are the values of the window generated by the phase detector 500 shown in FIG. 1, using the clock signal of 4.096 MHz through the clock signal of 8 KHz, divided in the divider 400.

Figure 12:
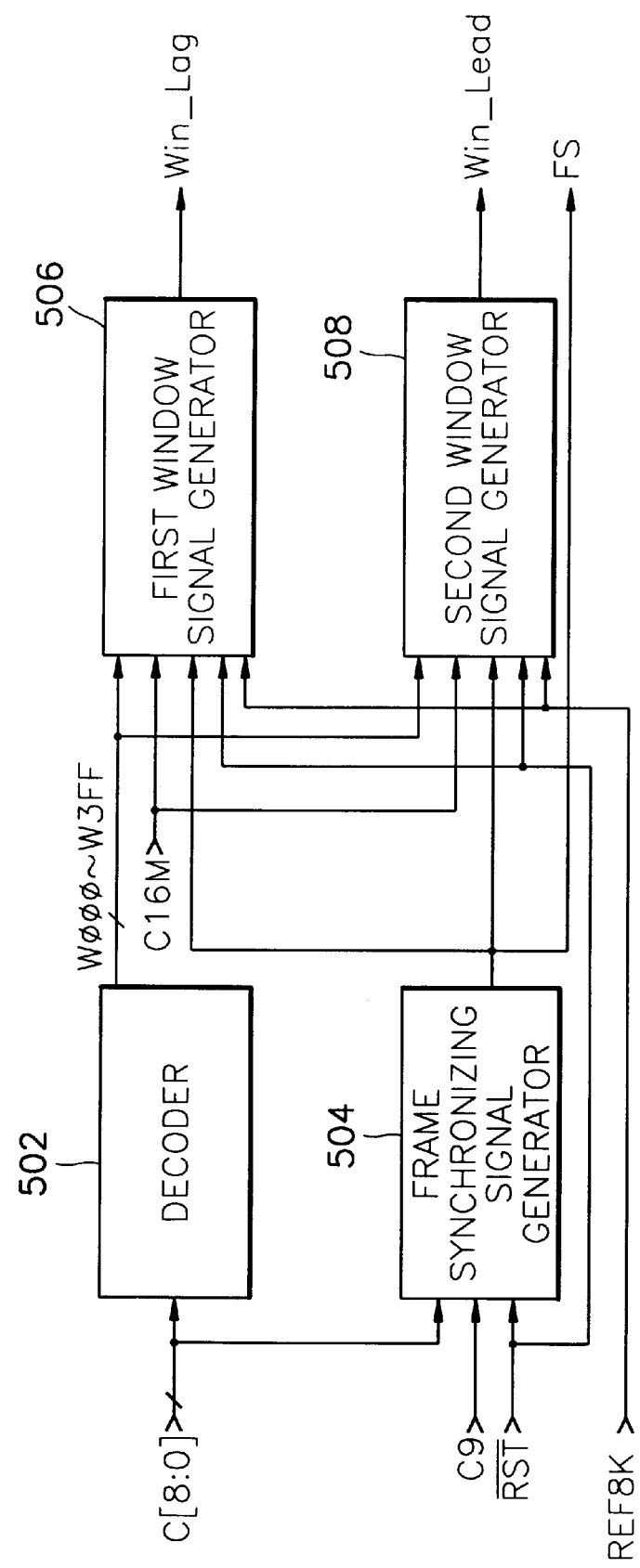
FIG. 12 is a block diagram of the phase detector shown in FIG. 1.

FIG. 12 is a block diagram of the phase detector 500 shown in FIG. 1, and will be explained in relation to FIGS.

13, 14, and 15. In FIG. 12, a decoder 502 receives the divided clock signals output from the divider 400 shown in FIG. 1 and outputs decoded output data (W000 through W3FF) to first and second window signal generators 506 and 508.

Figure 13:
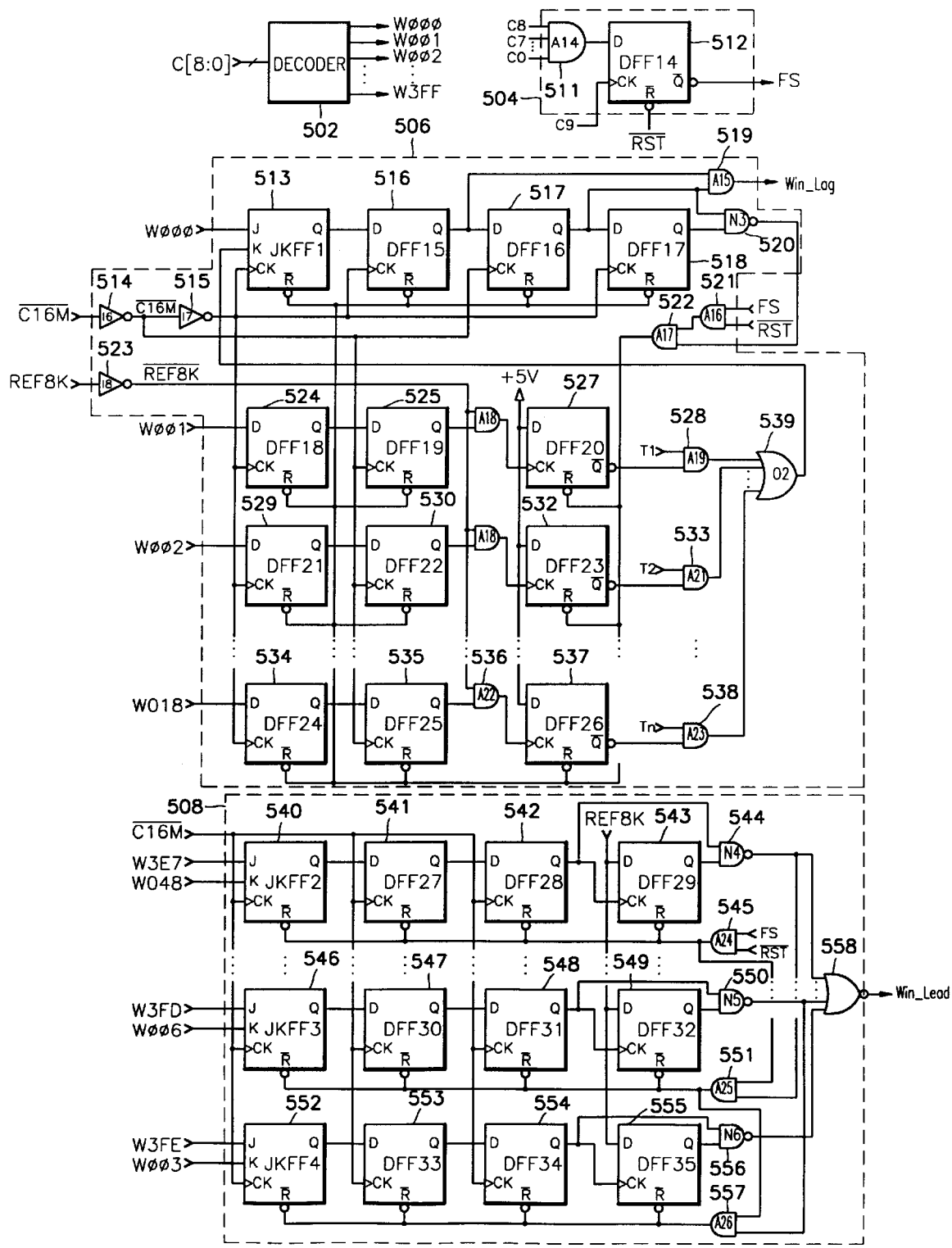
FIG. 13 is a circuit diagram of the phase detector shown in FIG. 12.

A frame synchronizing signal generator 504 is comprised of a fourteenth AND gate 511 for performing an AND operation on the divided clock signals output from the divider 400, and a fourteenth D flip-flop 512, reset by the inverted reset signal ($\overline{RST}$ 34), for latching the output of the fourteenth AND gate 511 according to the clock signal (C9) of 4.096 MHz output from the frequency synthesizer 300 shown in FIG. 1 and outputting the frame synchronizing signal (FS) from the inverting output port ($\overline{Q}$ 35), as shown in FIG. 13.

The detailed structure of the first window signal generator 506 is shown in FIG. 13. The first window signal (Win_Lag) is generated by receiving the output data (W000 through W018) of the decoder 502, the master clock signal (C16M), the reference clock signal (REF8K) output from the impulse noise remover 100 shown in FIG. 1 and the inverted reset signal ($\overline{RST}$ 36). T1, T2, . . . , and Tn input to nineteenth, twenty-first, . . . , and twenty-third AND gates 528, 533, . . . , and 538 shown in FIG. 13 are decoded predetermined values output from the decoder 502. The values are increased by equation 1 (see below).

For example, since the reference clock signal (REF8K) as shown in FIG. 14A is sampled in the window value W001 generated from the decoder 502 as shown in FIG. 14C, using a self-divided clock signal, the first window signal (Win_Lag) is output from the nineteenth AND gate 528 through the eighteenth, nineteenth, and twentieth D flip-flops 524, 525, and 527 of the first window generator 506 of FIG. 13, and is applied to the frequency synthesizer 300 shown in FIG. 1. The logic "high" portion of the first window signal (Win_Lag) starts from W001. T1, which determines the logic "low" of the first window signal (Win_Lag), becomes W00A by equation 1 (see below).

Namely, the first window signal generator 506 inputs the self-divided clock signals from the divider 400 and generates a window using the window value (W×××) generated by the decoder 502. As shown in FIG. 13, the window value (W×××) is divided into 24 steps (W001 through W018) and the logic "high" point of the first window signal (Win_Lag) is previously determined according to the divided steps. The logic "low" point of the first window signal is determined by sampling the reference clock signal (REF8K). The logic "low" is determined by the Tn value determined by the final W××× value detected by sampling from W001. The value Tn is a predetermined value.

Namely, the value Tn of the first window signal (Win_Lag) can be obtained by the following equation 1.

$$Tn=[\{(D\ input\ W\times\times\times\ value-1)/2\}\times 5+5]\times 2,\ when\ W\times\times\times\ is\ odd$$
$$=[(D\ input\ W\times\times\times\ value/2)\times 5+2]\times 2,\ when\ W\times\times\times\ is\ even$$

for example, when D=001, $$T1=[\{(1-1)/2\}\times 5+5]\times 2=A(=W00A),$$

when D=002, $$T2=[(2/2)\times 5+2]\times 2=E(=W00E),$$

when D=003, $$T3=[\{(3-1)/2\}\times 5+5]\times 2=14(=W014).\quad\quad [EQUATION\ 1]$$

The detailed structure of the second window signal generator 508 is shown in FIG. 13. The second window signal (Win_Lead) is generated by receiving the output data of the decoder 502, the master clock signal (C16M), the reference clock signal (REF8K), and the inverted reset signal ($\overline{RST}$ 37).

Namely, the window is generated by receiving the clock signals self-divided in the divider 400, using the window value (W×××). The reference clock signal (REF8K) is sampled at the rising edge of the window. When the sampling result is generated, the second window signal (Win_Lead) is made logic "high", maintained at a calculated predetermined value, and restored to logic "low".

Since the reference clock signal (REF8K) as shown in FIG. 15A is sampled in the window value W3FE generated by the decoder 502 as shown in FIG. 15C, using a self-divided clock signal, a JK flip-flop 552 of the second window signal generator 508 of FIG. 13 and 33rd, 34th, and 35th D flip-flops 553, 554, and 555 operate, thus generating the second window signal (Win_Lead) shown in FIG. 15B, having a logic "high" section in the window value from W3FE to W003, through a sixth NAND gate 556 and a NOR gate 558.

The second window signal generator 508 of FIG. 13 generates the second window signal (Win_Lead) of 24 step. An input value K of one input port of the JK flip-flop 540, . . . 546, 552 of the respective steps is obtained by the following equation 2. An input value J of the other input port of the JK flip-flop of the respective steps is a decoded value to which the sampled reference clock signal (REF8K) is input.

$$K=(1's\ complement\ of\ J)\times 3$$

for example, when J is 3FE, $$K=1\times 3=3(=W003),$$

when J is W3FD, $$K=2\times 3=6(=W006)\quad\quad [EQUATION\ 2]$$

As mentioned above, the PLL circuit according to the present invention is less expensive than an analog PLL circuit and has a simple structure. The PLL circuit guarantees a reliable reference clock signal by using an impulse noise remover, thus preventing malfunction, and reduces a synchronizing time by using an acquisitor.

What is claimed is:

1. A digital PLL circuit, comprising:
   an acquisitor, for generating a reset signal, in response to an internal reference clock signal and to an act mode signal, for synchronizing with an external system;
   a phase detector, operative to be reset by the reset signal, for comparing the phase of the internal reference clock signal with that of a first clock signal, and for generating and outputting first and second window signals;
   a frequency synthesizer for generating a corrected clock signal by changing the division ratio of a system clock signal according to the first or the second window signal, said corrected clock signal output as a locked clock signal;
   an impulse noise remover for removing an impulse noise component from an external reference clock signal and for outputting said internal reference clock signal having had noise removed therefrom, to said acquisitor and said phase detector; and a divider, resetable by the reset signal for dividing the locked clock signal and supplying a plurality of divided clock signals, including the first clock signal to the phase detector.

2. The digital PLL circuit of claim 1, wherein the impulse noise remover comprises a plurality of shift registers for shifting the external reference clock signal, and an adding circuit for adding the outputs of the plurality of shift registers, and said impulse noise remover being operative to remove pulses having a size not more than predetermined number of bits, dependent on the number of shift registers.

3. The digital PLL circuit of claim 1, wherein the acquisitor maintains a free-run mode when the act mode signal is in an inactive state, and generates a reset signal and outputs it to the divider and the phase detector, in order to synchronize with the internal reference clock signal having had noise removed therefrom, when the act mode signal is in an active state.

4. The digital PLL circuit of claim 1, wherein the phase detector comprises:

a decoder for decoding the plurality of divided clock signals and outputting a decoded value;

a first generator for generating the first window signal, using the decoded value, when the first clock signal lags the internal reference clock signal; and a second generator for generating the second window signal, using the decoded value, when the first clock signal leads the internal reference clock signal.

5. The digital PLL circuit of claim 4, wherein the phase detector further comprises a frame synchronizing signal generator for performing an AND operation on the plurality of divided clock signals and generating a frame synchronizing signal, synchronized with said locked clock signal output from the frequency synthesizer.

6. The digital PLL circuit of claim 5, wherein the frequency synthesizer comprises:

a first dividing circuit for dividing the system clock signal by a first predetermined number and generating a resultant clock signal when the first and second window signals are not generated, said resultant clock signal used as the locked clock signal;

a second dividing circuit for dividing the system clock signal by a second predetermined number in the first window region in response to the first window signal and generating the corrected clock signal; and a third dividing circuit for dividing the system clock signal by a third predetermined number in the second window region in response to the second window signal and generating the corrected clock signal.

7. A digital PLL circuit, comprising:

an acquisitor, for generating a reset signal, in response to an internal reference clock signal and to an act mode signal, for synchronizing with an external system;

a phase detector, operative to be reset by the reset signal, for comparing the phase of the internal reference clock signal with that of a first clock signal, and for generating and outputting first and second window signals; and a frequency synthesizer for generating a corrected clock signal by changing the division ratio of a system clock signal according to the first or the second window signal, said corrected clock signal output as a locked clock signal, and wherein the frequency synthesizer does not correct the system clock signal when the internal reference clock signal is received in a pass window region, in order to prevent self-jitter.

8. A digital PLL method, comprising the steps of:

(a) generating an internal reference clock signal having had noise removed, by removing an impulse noise component from an external reference clock signal;

(b) generating a reset signal, according to said internal reference clock signal and according to an act mode signal, for synchronizing with an external system;

(c) generating first or second window signals by comparing the phase of the internal reference clock signal with that of a first clock signal, after being reset by the reset signal;

(d) generating a corrected clock signal by changing the division ratio of a system clock signal according to the first or second window signal, and outputting said corrected clock signal as a locked clock signal; and (e) generating a plurality of divided clock signals including the first clock signal, by dividing the locked clock signal, after being reset by the reset signal.

9. The method of claim 8, wherein the step (c) comprises the steps of:

(c1) decoding the plurality of divided clock signals and generating a decoded value;

(c2) generating the first window signal using the decoded value when the first clock signal lags the internal reference clock signal; and (c3) generating the second window signal using the decoded value when the first clock signal leads the internal reference clock signal.

10. The method of claim 9, wherein the step (c) further comprises the step of:

(c4) performing an AND operation on the plurality of divided clock signals and generating a frame synchronizing signal, synchronizing with the locked clock signal.

11. The method of claim 9, wherein the step (d) comprises the steps of:

(d1) generating a resultant signal by dividing the system clock signal by a first predetermined number when the first and second window signals are not generated, said resultant signal used as said locked clock signal;

(d2) generating the corrected clock signal by dividing the system clock signal by a second predetermined number in response to the first window signal; and (d3) generating the corrected clock signal by dividing the system clock signal by a third predetermined number in response to the second window signal.

* * * * *